United States Patent

Hayashida et al.

[11] Patent Number: 5,913,999
[45] Date of Patent: Jun. 22, 1999

[54] PROCESS FOR PRODUCING LAMINATED FILM AND LAMINATED SHEET

[75] Inventors: Haruo Hayashida, Chiba; Fumio Ishibashi, Ichihara; Kohji Kubo, Ichihara; Hiroaki Takahata, Ichihara; Yuji Gotoh, Chiba, all of Japan

[73] Assignee: Sumitomo Chemical Company, Limited, Osaka, Japan

[21] Appl. No.: 08/782,086

[22] Filed: Jan. 13, 1997

Related U.S. Application Data

[63] Continuation of application No. 08/306,312, Sep. 15, 1994, abandoned.

[30] Foreign Application Priority Data

| Sep. 21, 1993 | [JP] | Japan | 5-234577 |
| Dec. 14, 1993 | [JP] | Japan | 5-313385 |
| Dec. 27, 1993 | [JP] | Japan | 5-331583 |
| Dec. 27, 1993 | [JP] | Japan | 5-331584 |
| Mar. 31, 1994 | [JP] | Japan | 6-063024 |

[51] Int. Cl.$^6$ .................................................. B32B 31/00
[52] U.S. Cl. ....................... 156/272.2; 156/244.17; 156/244.23; 156/274.6; 156/309.9
[58] Field of Search ................. 156/244.17, 244.23, 156/272.2, 272.6, 273.3, 274.4, 274.6, 309.6, 309.9

[56] References Cited

U.S. PATENT DOCUMENTS

| 4,481,289 | 11/1984 | Honma | 430/532 |
| 4,609,420 | 9/1986 | Aydin et al. | 156/272.6 |
| 4,645,551 | 2/1987 | Adams et al. | 156/272.6 X |
| 4,717,516 | 1/1988 | Isaka et al. | 156/272.6 X |
| 5,028,292 | 7/1991 | Incremona et al. | 156/272.6 |
| 5,032,209 | 7/1991 | Shinbach et al. | 156/272.6 |
| 5,051,586 | 9/1991 | Sabreen | 156/272.6 X |

FOREIGN PATENT DOCUMENTS

| 1910743 | 10/1969 | Germany . |
| 3210434 A1 | 10/1982 | Germany . |
| 1254600 | 11/1971 | United Kingdom . |

OTHER PUBLICATIONS

*Database WPI*, Week 9215, Derwent Publications Ltd., London, GB; XP002060348 (corresponds to JP 04 062 054.
*Database WPI*, Week 8605, Derwent Publications Ltd., London, GB; XP002060349 (corresponds to JP 60 250 938.
*Database WPI*, Week 9213, Derwent Publications Ltd., London, GB; XP002060350 (corresponds to JP 04 041 238.
*Database WPI*, Week 8433, Derwent Publications Ltd., London, GB; AN 84–203770 (corresponds to JP–A–59 115 843).
*Database WPI*, Week 9221, Derwent Publications Ltd., London, GB: AN 92–170313 (corresponds to JP–A–4 097 842).
*Database WPI*, Week 8706, Derwent Publications Ltd., London, GB: AN 87–039626 (corresponds to JP–A–61 295 025).
*Database WPI*, Week 9306, Derwent Publications Ltd., London, GB; AN 93–047611 (corresponds to JP–A–4 368 845).
*Database WPI*, Week 8108, Derwent Publications Ltd., London, GB; AN 81–12729D (corresponds to JP–A–55 161 620).

(List continued on next page.)

*Primary Examiner*—James Engel
*Attorney, Agent, or Firm*—Sughrue, Mion, Zinn, Macpeak & Seas, PLLC

[57] ABSTRACT

A process for producing an extrusion laminated film or sheet comprising a plastic substrate and a resin for extrusion laminating selected from the group consisting of polyethylene resins, polypropylene resins, ethylene-vinylester copolymer resins and ethylene-(metha)acrylate copolymer resins, comprising (A) a surface oxidizing step, (B) an ozone-treating step and (C) a pressurized laminating step as specified using no chemical primer.

16 Claims, 1 Drawing Sheet

VARIATION OF THE VALUE OF Δ(O/C) ON THE SURFACE OF CORONA TREATED BIAXIALLY STRETCHED NYLON WITH TIME (hr)

OTHER PUBLICATIONS

*Database WPI*, Week 9311, Derwent Publications Ltd., London, GB; AN 93–088351 (corresponds to JP–A–531 850).

*Database WPI*, Week 9335, Derwent Publications Ltd., London, GB; AN 93–277821 (corresponds to JP–A–5 193 018).

*Database WPI*, Week 8644, Derwent Publications Ltd., London, GB; AN 86–288487 (corresponds to JP–A–61 211 347).

FIG. 1

VARIATION OF THE VALUE OF Δ(O/C) ON THE SURFACE OF CORONA TREATED BIAXIALLY STRETCHED NYLON WITH TIME (hr)

5,913,999

PROCESS FOR PRODUCING LAMINATED FILM AND LAMINATED SHEET

This is a Continuation of application Ser. No. 08/306,312 filed Sep. 15, 1994, abandoned.

BACKGROUND OF THE INVENTION

1. Field of the Invention

The present invention relates to a process for producing an extrusion laminated film and an extrusion laminated sheet. More particularly, the present invention relates to a process for producing an extrusion laminated film and an extrusion laminated sheet with at least one resin for extrusion laminating selected from the group consisting of polyethylene resins, polypropylene resins, ethylene-vinylester copolymer resins and ethylene-(metha)acrylate copolymer resins, which enables production of an extrusion laminated film and an extrusion laminated sheet comprising a plastic substrate having films firmly adhered thereto without using any chemical primer agent.

2. Description of the Related Art

Production of extrusion laminated films and sheets comprising stacked different film materials such as plastic, paper, metal foils and the like having additionally other properties than those possessed by single material, for example, increased strength, gas impermeability, moisture-proofing property, heat-sealing property, improved appearance, and the like has been widely conducted and the products have primarily been used in a variety of wrappings. Such laminated films and sheets have been produced by any one of methods such as dry laminating, wet laminating, hot laminating, extrusion laminating, coextrusion laminating, and the like, selected depending upon characteristics to be utilized. Wrapping materials comprising a substrate having a heat-seal layer have been produced by the popularly used extrusion laminating method to form the heat-seal layer on the substrate which is advantageous in cost. Materials to be generally used for the heat-seal layer include polyolefin resins such as polyethylenes, polypropylenes, and ethylene copolymers, and ionomers. However, polyolefin resins have been used in large qualities from the economical standpoint.

These resins are generally melt-extruded and laminated onto the adhesive surface of a substrate which has been precoated with a chemical primer to promote the adhesion between the substrate and the resins. The chemical primers to be used include organic titanate, organic isocyanate, and polyethyleneimine type adhesives. When used, these adhesives are usually diluted with an organic solvent such as toluene, ethyl acetate, methanol, hexane and the like. However, these methods using the chemical primers produce problems such as increased production costs owing to the use of expensive chemical primers, required complicated steps of applying and drying the chemical primers, scattering of organic solvents harmful to human beings into the air when the chemical primers are dried by evaporating the organic solvents therein causing environmental hazards in and around workplaces, occurrence of fire due to the use of inflammable organic solvents, and limited utilization of the end film or sheet products in food wrappings owing to the odors attributable to the residual organic solvents in the chemical primers on the products.

As a method without using the chemical primers, an attempt has been made to produce a laminate by melt-kneading an ethylene copolymer produced by copolymerization of (a) ethylene, (b) unsaturated polybasic acid, and (c) an unsaturated monomer selected from lower alkyl acrylate esters, lower alkyl methacrylate esters and vinyl esters, extruding said molten copolymer at a temperature of 150° C. to 330° C. into a molten web, treating the molten web with ozone and laminating the molten web onto a substrate under pressure with the ozone treated surface of the molten web being adhered onto the surface of the substrate as described in Japanese Patent KOKAI (Laid-open) No. Hei 4-368845, wherein however only biaxially stretched nylon film was practically employed, and no practical use of ethylene-vinyl alcohol copolymers as substrate was disclosed. In addition, the methods using the ethylene copolymers containing the unsaturated polybasic acids as comonomer component and having adhesive function suffer from added production cost, lower release property in the extrusion laminating process of laminates with an increase in the amount of low melting components to limit processing temperatures as well as cumbersome exchange of resins in the extruder which may be required by the methods.

Alternatively, a method for producing an extrusion laminated film by treating the surfaces of an ethylene-α-olefin copolymer molten web to be adhered onto a substrate with ozone and laminating the molten web onto the substrate without applying any chemical primer to the substrate, or a method for producing an extrusion laminated film by coextruding a modified polyolefin resin grafted with unsaturated carboxylic acids having an adhesive property onto a substrate without any chemical primer through a combination with a coextruder have been known, as disclosed in CONVERTIC (8) p. 36, (1991). However, the laminates obtained by these methods have disadvantages of insufficient adhesion strength between the laminated resin layer and the substrate limiting the area where the laminates are applied. Moreover, the method using the adhesive modified polyolefin resins grafted with unsaturated carboxylic acids requires disadvantageously the use of coextruder with an increase in production cost as well as cumbersome exchange of resins in the extruder.

SUMMARY OF THE INVENTION

An object of the present invention, to overcome the aforementioned problems, is to provide a process for producing an extrusion laminated film or sheet comprising a plastic substrate and a resin for extrusion laminating selected from the group consisting of polyethylene resins, polypropylene resins, ethylene-vinylester copolymer resins and ethylene-(metha)acrylate copolymer resins, wherein the strongly adhered laminate film or sheet can be obtained without using chemical primers which may cause aforementioned many problems.

Another object of the present invention is to provide a process for producing an extrusion laminated film or sheet comprising a plastic substrate and a resin for extrusion laminating selected from the group consisting of polyethylene resins, polypropylene resins, ethylene-vinylester copolymer resins and ethylene-(metha)acrylate copolymer resins, comprising (A) a surface oxidizing step, (B) an ozone-treating step and (c) a pressured laminating step using no chemical primer, as defined below:

(A) Surface oxidizing step: Subjecting at least one of the surfaces of a plastic substrate to a surface oxidizing treatment under the conditions as expressed by the following formula:

(1) When the plastic substrate is of polyester resins, $$\Delta(O/C) \geq 0.08$$

(2) When the plastic substrate is of other materials than polyester resins, $\Delta(O/C) \geq 0.05$ with $\Delta(O/C)=(O/C)^*-(O/C)^0$, where $(O/C)^0$ represents a ratio of the number of oxygen atom to the number of carbon atom on the untreated surface of the plastic substrate measured by a ESCA method, and $(O/C)^*$ represents a ratio of the number of oxygen atom to the number of carbon atom on the oxidized surface of the plastic substrate measured by the ESCA method;

(B) Ozone-treating step: Melt-extruding a resin for extrusion laminating into a molten web at a temperature of 180° C. to 340° C. and subjecting at least one the surfaces of the molten web to a treatment with ozone;

(C) Pressurized laminating step: Contacting the oxidized surface of the plastic substrate obtained in (A) the surface oxidizing step with the ozone-treated surface of the molten web obtained in (B) the ozone-treating step, and adhering the molten web onto the substrate under pressure while maintaining for the oxidized surface of the plastic substrate to be adhered under pressure.

Still another object of the present invention is to provide a process for producing an extrusion laminated film or sheet comprising an ethylene-vinylalcohol copolymer substrate having a layer of an extrudable resin laminated, which is selected from the group consisting of polyethylene resins, polypropylene resins, ethylene-vinylester copolymer resins and ethylene-(metha)acrylate copolymer resins, comprising (B) an ozone-treating step and (C) a pressured laminating step using no chemical primer, as defined below:

(B) Ozone-treating step: Melt-extruding a resin for extrusion laminating into a molten web at a temperature of 180° C. to 340° C. and subjecting at least one of the surfaces of the molten web to a treatment with ozone.

(C) Pressurized laminating step: Contacting the surface of the substrate with the ozone-treated surface of the molten web obtained in (B) the ozone-treating step, and adhering the molten web onto the substrate under pressure.

DETAILED DESCRIPTION OF PREFERRED EMBODIMENTS

The plastic materials to be used as the substrate of the present invention include resins such as nylon resins, polyester resins, ethylene-vinylalcohol copolymer resins, polyvinyl alcohol resins, polypropylene resins, polyethylene resins, ethylene copolymer resins, ionomer resins, cellophane, polyvinylidene chlorides, polystyrenes, polyvinyl chlorides, polycarbonates, polymethylmethacrylates, polyurethanes, fluorinated resins, polyacrylonitriles, acetyl celluloses, polybutene resins, polyimide resins, and polyacrylate resins, which may be used alone or in combination in the form of laminate films and sheets, stretched films, coatings and fabrics. The plastic substrates may be used in the form of laminate with aluminum, iron, paper and the like stacked on the substrates with the resins being disposed in the interface therebetween. If necessary, the surfaces of the plastic substrates may be pretreated by corona discharge, plasma treatment, or flame treatment, or they may be preprinted. The thickness of the substrates are not critical so long as the substrates can be processes by extrusion laminating, and preferably should be in the range of 1 to 10,000$\mu$, more preferably 5 to 500$\mu$.

The resins for extrusion laminating to be used in the present invention may be any one or a mixture of two or more selected from the group consisting of polyethylene resins, polypropylene resins, ethylene-vinylester copolymer resins and ethylene-(metha)acrylate copolymer resins. If necessary, other resins may be mixed in an amount of less than 50% by weight.

The process for producing the polyethylene resins is not critical, for example, they may be produced by radical polymerization or ion polymerization. The polyethylene resins include, for example, low density polyethylenes produced by radical polymerization, high density polyethylenes produced by ion polymerization, and ethylene-$\alpha$-olefin copolymers produced by copolymerization of ethylene and $\alpha$-olefins. The a $\alpha$-olefins to be used include, for example, $\alpha$-olefins having 3 to 18 carbon atoms, such as propylene, butene-1, 4-methylpentene-1, hexene-1, octene-1, decene-1, and octadecene-1, which may be used alone or in combination of two or more. The ethylene-$\alpha$-olefin copolymers should have a $\alpha$-olefin content of, preferably 1 to 30% by weight, more preferably 5 to 20% by weight.

The process for producing polypropylene resins is not critical, and for example, they may be produced by ion polymerization. The polypropylene resins include, for example, homopolymers of propylene, copolymers of propylene with ethylene, copolymers of propylene with butene-1, and copolymers of propylene with $\alpha$-olefins. For the propylene copolymers, one or more $\alpha$-olefins may be used. The propylene-$\alpha$-olefin copolymers should have a $\alpha$-olefin content of, preferably 0.1 to 40% by weight, more preferably 1 to 30% by weight.

Ethylene-vinylester copolymer resins and ethylene-(metha)acrylate copolymer resins may be produced by radical polymerization, e.g., by copolymerization of ethylene with radically copolymerizable monomers.

Vinyl esters for the ethylene-vinylester copolymers include, for example, vinyl acetate and vinyl propionate.

(Metha)acrylates for the ethylene-(metha)acrylate copolymers include, for example, acrylates having 4 to 8 carbon atoms such as methyl acrylate, ethyl acrylate, n-propyl acrylate, isopropyl acrylate, n-butyl acrylate, t-butyl acrylate, isobutyl acrylate, and methacrylates having 4 to 8 carbon atoms such as methyl methacrylate, ethyl methacrylate, n-propyl methacrylate, isopropyl methacrylate, n-butyl methacrylate, t-butyl methacrylate, and isobutyl methacrylate. One or more of these comonomers may be used.

Ethylene-vinylester copolymers and ethylene-(metha)acrylate copolymers should have a comonomer content of, preferably not higher than 30% by weight, more preferably not higher than 20% by weight. A content of comonomer component to be copolymerized with ethylene higher than 30% by weight results in worse odor of the laminate films and sheets rendering them unsuitable for food wrapping materials as well as increased production cost, though there is no problem in the adhesiveness to the substrate, the primary object of the present invention.

Polyethylene resins, ethylene-vinylester copolymer resins, and ethylene-(metha)acrylate copolymer resins should have a melt flow rate (MER) at 190° C. in the range of 1 to 100 g/10 min., and polypropylene resins should have a MER at 230° C. in the range of 1 to 100 g/10 min.

The surface oxidizing step (A) of the present invention comprises subjecting at least one of the surfaces of the plastic substrate to surface oxidizing treatment to generate at least a predetermined level of oxidation activated sites, thereby affording strong adhesion. The term at least predetermined level of oxidation activated sites is defined by $\Delta(O/C)$ as explained below.

Namely, the conditions of the treatment are expressed by the following formula:

(1) When the plastic substrate is of polyester resins, $$\Delta(O/C) \geq 0.08$$

(2) When the plastic substrate is of other materials than polyester resins, $$\Delta(O/C) \geq 0.05$$

with $\Delta(O/C)=(O/C)^*-(O/C)^0$, where $(O/C)^0$ represents a ratio of the number of oxygen atom to the number of carbon atom on the untreated surface of the plastic substrate measured by an ESCA method, and $(O/C)^*$ represents a ratio of the number of oxygen atom to the number of carbon atom on the oxidized surface of the plastic substrate measured by the ESCA method.

Preferably the conditions should be expressed by the following formula:

(1) When the plastic substrate is of polyester resins, $$\Delta(O/C) \geq 0.10$$

(2) When the plastic substrate is of other materials than polyester resins, $$\Delta(O/C) \geq 0.07$$

with $\Delta(O/C)=(O/C)^*-(O/C)^0$, where $(O/C)^0$ and $(O/C)^*$ are as defined above.

The $(O/C)^*$ is a value obtained by conducting the measurement at 30 minutes after the plastic substrate was subjected to the surface oxidizing treatment according to the present invention and a molten web made of the resins for extrusion laminating was adhered onto the substrate. Practically a plastic substrate which has been subjected to the surface oxidizing treatment, but which has no molten web adhered was additionally provided and measured.

The term ESCA means Electron Spectroscopy for Chemical Analysis, and $(O/C)^*$ and $(O/C)$ are determined as follows: A product of the area of the peak in strength by the relative sensitivity of the peak is determined for each of $O_{15}$ and $C_{15}$, and the ratio of existing oxygen and carbon atoms $(O/C)$ is determined from both the products. Further details of the determination are given, for example, by IKADA YOSHIHITO in "Fundamental and Application of Surfaces of Polymers (I)" (KAGAKU DOJIN Publisher, 1986) Section 4.

Variation of $\Delta(O/C)$ with time is explained under.

Figure 1:
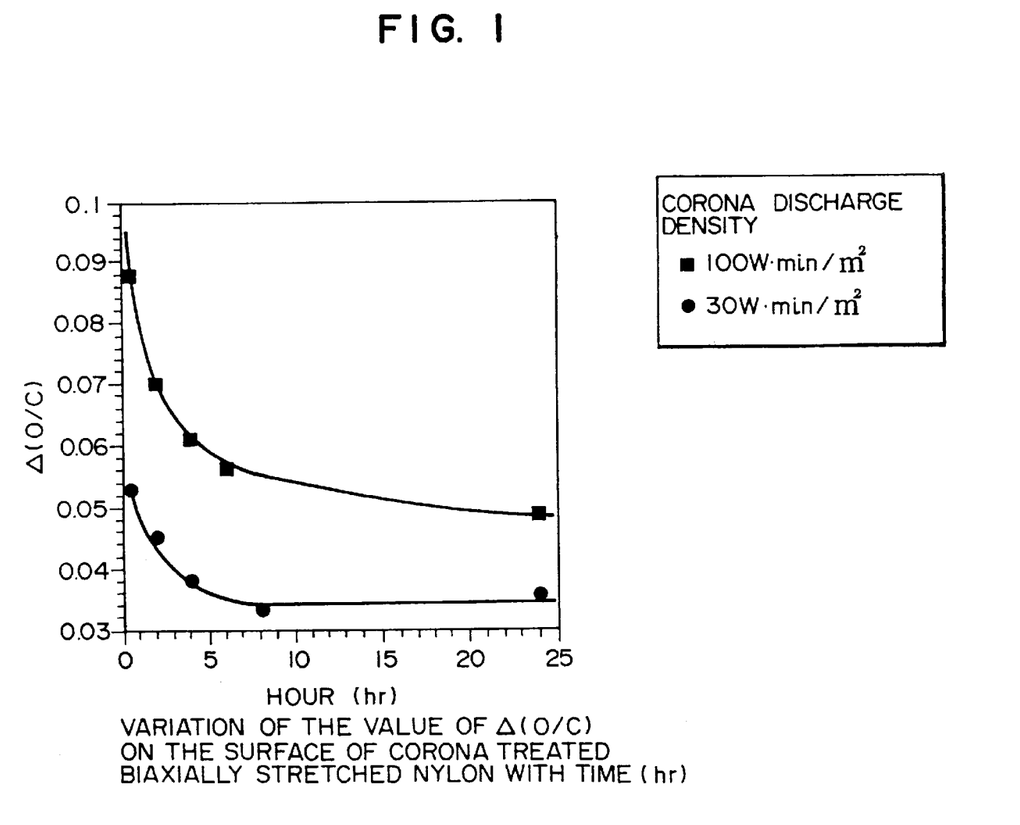
FIG. 1 is a graph showing a variation in the value of $\Delta(O/C)$ of the surface of the corona-treated biaxially stretched nylon film with time.

FIG. 1 shows the variation of $\Delta(O/C)$ with time for the case where the plastic substrate was a biaxially stretched nylon film and the surface oxidizing treatment was effected with corona discharge.

As clearly seen from the Figure, the value of $\Delta(O/C)$ is rapidly reduced with time, for example,it becomes lower than 0.05 after one day at a corona density of 100 W·min./m² and it becomes actually lower than 0.05 at 30 W·min./m² when the corona discharge is performed not in-line with the ozone-treatment step and the pressured laminating step, thus causing insufficient adhesive strength to be achieved.

Similarly when the substrate is of polyester resins, the value of $\Delta(O/C)$ is lower than 0.08, causing insufficient adhesive strength to be achieved.

That is, when the value of $\Delta(O/C)$ is excessively small, one can not achieve sufficient adhesive strength.

The polyester resins are polymer resins obtained by condensation polymerization of aromatic dicarboxylic acids such as terephthalic acid, and 2,6-naphthalene dicarboxylic acid, with aliphatic glycols such as ethylene glycol, diethylene glycol, and 1,4-cyclohexane dimethanol. Representative examples of such polymers are polyethylene terephthalate (PET), polyethylene 2,6-naphthalene dicarboxylate (PEN), and polybutylene terephthalate (PBT). The polymers may be those containing not higher than 20 mole % of the third components other than said polymers. In this case, dicarboxylic acid components to be used include, for example, isophthalic acid, phthalic acid, terephthalic acid, 2,6-naphthalene dicarboxylic acid, adipic acid, sebacic acid, oxycarboxylic acid (for example, and p-oxybenzoic acid and the like), which may be used alone or in combination of two or more. The glycol components to be used include ethylene glycol, propylene glycol, butane diol, 1,4-cyclohexane dimethanol, and neopentyl glycol, which may be used alone or in combination of two or more.

Although there are commercially available plastic substrates which have been subjected to surface oxidizing treatment such as corona discharge, for improving printability of the surfaces, such commercial products can not achieve such sufficient strong adhesion as intended by the present invention, if they were used as they are without conducting the surface oxidizing treatment of the present invention.

The surface oxidizing step (A) may be practically performed by any one of treatments with ($a_1$) corona discharge, ($a_2$) plasma, ($a_3$) flame plasma, ($a_4$) electron beam irradiation, or ($a_5$) UV irradiation, as described in detail later.

The ozone-treating step (B) comprises melt-extruding a resin for extrusion laminating into a molten web at a temperature of 180° C. to 340° C. and subjecting at least one of the surfaces of the film to a treatment with ozone. The treatment with ozone may be performed by, for example, blowing a gas such as containing ozone from a nozzle or slit like blowing opening in a lower open gap disposed under a T die onto the extruded molten web. When the ozone nozzle can not be disposed under the T die, the gas may be blown onto the plastic substrate immediate before laminating under pressure. The amount of ozone to be blown should preferably be not less than 1.0 mg per square meter of the surface of the extruded molten web which is being transferred, more preferably not less than 10.0 mg/m². The resins for extrusion laminating are melt-extruded into a molten web at a temperature of 180° C. to 340° C. A temperature lower than 180° C. may result in poor stretchability of the molten webs, make it difficult to produce uniform thickness of molten web, and cause insufficient adhesive strength with the plastic substrate. On the other hand, a temperature higher than 340° C. may produce severer oxidation of the surfaces of the molten webs and worse odor of the webs. Preferred resin temperature is from 210 to 330° C.

The pressurized laminating step (C) according to the present invention comprises contacting the oxidized surface of the plastic substrate obtained in the surface oxidizing step with the ozone-treated surface of the molten web obtained in the ozone-treating step, and adhering the film onto the substrate under pressure while maintaining for the oxidized surface of the plastic substrate to be adhered under pressure.

For the pressurized laminating step of the present invention, one may use any one of known extrusion laminaters.

In the present invention,(A) the surface oxidizing step and (C) the pressurized laminating step should preferably be arranged in-line so as to transfer the plastic substrate to (C) the pressurized laminating step immediately after the end of (A) the surface oxidizing step. In this way a high level of adhesive strength can be developed to prevent undesirable blocking of the plastic substrate. The aforementioned "(C) the pressurized laminating step should preferably be arranged in-line so as to transfer the plastic substrate to (C) the pressurized laminating step immediately after the end of (A) the surface oxidizing step" means that the extrusion laminating process is accomplished by using an apparatus where the plastic substrate is sent out to be transferred through (A) the surface oxidizing step, (C) the pressurized laminating step, and the product winding step which are sequentially disposed in the same line along the flow path of the plastic substrate and which are promptly conducted in one sequential operation.

In the present invention, ($A_0$) a preheating step where the plastic substrate to be subjected to the surface oxidizing treatment is heated at a temperature of not lower than 40° C., but not higher than the melting point of the plastic substrate should preferably be provided before (A) the surface oxidizing step in order to further improve the adhesive strength.

The heating temperature should not be lower than 40° C., but not higher than the melting point of the plastic substrate, preferably not lower than 60° C. to 30° C. lower than the melting point of the plastic substrate. The heating temperature refers to the surface temperature of the plastic substrate which may be measured by, for example, a contact type thermometer. If the heating thermometer is too low, the resulting laminate films or sheets may attain insufficient improvement in adhesive strength between the plastic substrate and the extrusion laminated layer, while the heating thermometer is too high, there may be produced problems of shrinking or curling of the laminated film. Most suitable heating of the plastic substrate may be achieved by using far infrared ray heaters or heating rollers. For example, the plastic substrate may be passed under a far infrared ray heater in the course of transferring the plastic substrate to the surface oxidizing treatment step. For example, a plastic substrate having a width of 500 mm may be heated for 0.05 to 5 seconds at a distance between the surface of the plastic substrate and the heater of about 1 to 30 cm using a far infrared ray heater having an output of about 1 to 30 KW (when a plurality of heaters are used, the total output thereof).

In the present invention, for the purpose of further improving the adhesive strength, (D) an aging step where the extrusion laminated films or sheets obtained are aged in a warmed atmosphere should preferably be provided after (C) the pressurized laminating step.

The aging temperature should not be lower than 30 ° C., but lower than 50° C., preferably 40 to 45° C. Too low an aging temperature may attain insufficient improvement in adhesive strength, while too high an aging temperature may result in reduced heat-seal performance and reduced hot-tack performance, and moreover, may produce curling of laminate film and inconveniences in a slitting step and a content filling step, denaturation of the laminated films, and odor problems.

The aging time should usually be 1 to 120 hours, preferably 10 to 120 hours. Too short an aging time may attain insufficient improvement in adhesive strength, while too long an aging time may result in denaturation of the laminated films and disadvantageous productivity.

The aging step (D) may be accomplished by using an ordinary oven or a temperature-controllable chamber.

The present invention can be practiced in combination of all the preheating step ($A_0$), the surface oxidizing step (A), the ozone-treating step (B), the pressurized laminating step (C) and the aging step (D) to achieve stronger adhesive strength.

Next, embodiments of (A) the surface oxidizing step are described under.

The surface oxidizing step is practically conducted by any one of treatments using ($a_1$) corona, ($a_2$) plasma, ($a_3$) flame plasma, ($a_4$) electron beam irradiation, and ($a_5$) UV irradiation.

The corona discharge treatment step ($a_1$) comprises treating at least one of the surfaces of the plastic substrate with corona discharge. The corona discharge treatment may be conducted by passing the plastic substrate through a corona atmosphere generated with known corona discharging apparatus. In order to achieve a high level of adhesive strength, preferably the corona discharge density should not be less than 40 (W·min./m$^2$), more preferably not less than 50 (W·min./m$^2$). When the surface oxidatively preheating step and/or the aging step are used, preferred corona discharge density is 10 (W·min./m$^2$) or more.

The plasma-treating step ($a_2$) may be performed by exciting electronically single gas such as argon, helium, krypton, xenon, hydrogen, nitrogen and air, or a mixture of gases with plasma jet, then removing charged particles, and blowing the produced electrically neutral excited inert gases onto the surface of the plastic substrate.

The flame plasma-treating step ($a_3$) may be performed by blowing the plasma generated by ionization of the flame from combustion of naturally occurring gases or propane.

The electron beam irradiation step ($a_4$) may be carried out by irradiating the surface of the plastic substrate with electron beam generated with an electron accelerater. As electron beam irradiation apparatus, one may employ, for example, an apparatus under tradename "ELECTROCURTAIN" which is capable of irradiating curtain-like uniform electron beams from a linear filament.

The UV irradiating treatment step ($a_5$) may be conducted by, for example, irradiating the surface of the plastic substrate with ultraviolet radiation having a wavelength of 200 to 400 m$\mu$.

As the second embodiment, a process for producing an laminate film or sheet with a substrate comprising ethylene-vinylalcohol copolymers will be described under, though some common steps are the same as those described with reference to the first embodiment.

Materials to be used as the substrate of the present invention are ethylene-vinylalcohol copolymers. The ethylene-vinylalcohol may produced by a method comprising copolymerizing ethylene and vinyl acetate, and then saponifying the product, or by a method comprising copolymerizing ethylene and vinyl alcohol. The ethylene to be used in the copolymerization may be commercially available ethylene of a grade of usually 25 to 45 mole %. The ethylene-vinylalcohol copolymers to be used in the present invention may have no limitation in the degree of saponification and composition of the copolymers so long as they have a performance as laminate substrate. The ethylene-vinylalcohol copolymers may be used alone or in combination in the form of laminate films and sheets, stretched films, coatings and fabrics. Such materials may be laminated with aluminum, iron, paper or the like with the substrate being disposed on the abutting plane and the produced laminates may be used. If necessary, the surfaces of the substrates may be pretreated by corona discharge, plasma treatment, or flame treatment, or they may be preprinted. The thickness of the substrates are not critical so long as the substrates can be processes by extrusion laminating, and preferably should be in the range of 1 to 10,000$\mu$, more preferably 5 to 500$\mu$.

The resins for extrusion laminating to be used in the present invention may be any one selected from the group consisting of polyethylene resins, polypropylene resins, ethylene-vinylester copolymer resins and ethylene-(metha) acrylate copolymer resins. The same resins for extrusion laminating as those described above may be used.

The ozone-treating step (B) in this embodiment is the same as that described above in the first embodiment.

The pressurized laminating step (C) in this embodiment comprises contacting the substrate with the ozone-treated surface of the molten web obtained in (B) the ozone-treating step, and adhering the molten web onto the substrate under pressure using known extrusion laminater.

In this embodiment (A) a surface oxidizing step such as ($a_1$) corona discharge treatment and the like may be provided additionally to the aforementioned two steps. The term "(A) a surface oxidizing step" refers, for example, in the case of ($a_1$) corona discharge treatment, to a step comprising treating at least one of the surfaces of the substrate with corona discharge. The corona discharge treatment ($a_1$) may be conducted by passing the plastic substrate through a corona atmosphere generated with known corona discharging apparatus. From the standpoint of achieving a high level of adhesive strength, preferably the corona discharge density should not be less than 10 W·min./$m^2$, more preferably not less than 20 W·min./$m^2$. Moreover, the corona discharge treatment step and the pressurized laminating step (C) as described later should preferably be arranged in-line so that the plastic substrate after the corona discharge treatment step can be transferred to the pressurized laminating step (C). In this way a high level of adhesive strength can be developed and undesirable blocking of the plastic substrate can be prevented.

In the present invention, the resin extrusion laminated onto the plastic substrate may be applied to the heat-seal layer of the laminate films or sheets or to the intermediate layer of the laminate films or sheets depending upon the resin's functions such as easily heat-sealable property and moisture proofing property. Moreover, the present invention can apply to a sadwich type extrusion laminating method to form a laminate.

To the resins for extrusion laminating used in the present invention, there may be added known additives such as anti-oxidant agent, anti-blocking agent, weather-resisting agent, neutralizing agent, flame retarding agent, antistatic agent, anti-fogging agent, sliding agent, dispersant, pigment, organic or inorganic fillers.

The extrusion laminated films and sheets of the present invention have utility in wrapping materials such as food wrapping materials and medicine packaging materials as well as industrial materials.

EXAMPLES

The present invention is further illustrated with reference to the following examples, but should not be interpreted to be limited thereto.

Example 1

A low density polyethylene (LDPE, available from Sumitomo Chemical Industry Co. Ltd., under tradename "SUMIKATHENE", L716-H MFR 7 g/10 min., Density: 0.919 g/$cm^3$) was melt-kneaded with an extruder having an aperture diameter of 65 mm and extruded through a T die at a resin temperature of 315° C. into a molten web having a width of 450 mm a thickness of 50$\mu$ at an extrusion laminating speed of 80 m/min., and an ozone-containing air was blown to the surface of the molten web to be adhered onto the substrate through a nozzle disposed at a distance of 30 mm from the bottom of the die to achieve treatment of the contact surface of the molten web with ozone. The amount of ozone used for the treatment was 37 mg/$m^2$. Then the molten web was laminated onto a 15$\mu$ biaxially stretched EVOH (ethylene-vinylalcohol copolymer) film which had been modified by treating the surface thereof with corona discharge at a treatment density of 103 W·min./$m^2$ with a corona discharge apparatus provided in-line with the extrusion laminater to produce a laminate film. The produced laminate film was evaluated for various properties as follows. The results of the evaluation and the processing conditions are summarized in Table 1.

(1) Determination of (O/C)* and (O/C)$^0$

By using ESCALABMK-II available from FI Surface Science System Co., the ratio of existing oxygen and carbon atoms (O/C) is determined from the product of the area of the peak in strength by the relative sensitivity for $O_{15}$ and that for $C_{15}$. The (O/C)* was the value of measurement at 30 minutes after the substrate was subjected to the surface oxidizing treatment (corona discharge treatment) and the resin for extrusion laminating was adhered onto the substrate. Practically a plastic substrate which has been subjected to the surface oxidizing treatment at the same time with the laminated products, but which has no molten web laminated was additionally provided and measured for the surface thereof.

(2) Determination of film adhesion strength

The film adhesiveness was evaluated from the peeling strength when a laminate film of 15 mm in width was peeled at 180° at a pulling speed of 200 mm/min. with an autostrain type tensile tester available from Toyo Seiki Co. Ltd.

Examples 2 to 14 and
Comparative Examples 1 to 24

Example 1 was repeated, except that the conditions as shown in Tables 1 to 3 and Tables 7 to 11 were used. In Examples 5, 6, 10, and Comparative Examples 4, 5, 12, 13 and 14, the melt-kneading was effected with two extruders having an aperture diameter of 65 mm to extrude the same LDPE through a multi-slot T die into a molten web having a total thickness of 60$\mu$ (30$\mu$ each). In Examples 7, 13, and Comparative Examples 9, 10, 22, 23 and 24, the same procedure as above was employed to provide LDPE or EMMA for a layer contacting with the plastic substrate and LLDPE for a sealant layer which were coextruded to form a laminate. The results of the evaluation and the processing conditions are summarized in Tables 1 to 3 and Tables 7 to 11, in which the column heading "-" represents no treatment effected.

Examples 15 to 17

In Example 15, a linear low density polyethylene (LLDPE, available from Sumitomo Chemical Industry Co. Ltd., under tradename "SUMIKATHENE α" CS8026 MFR 10 g/10 min., Density: 0.914 g/$cm^3$) was melt-kneaded with two extruders having an aperture diameter of 65 mm and extruded through a multi-slot T die at a resin temperature of 290° C. into a molten web having a width of 450 mm and a total thickness of 60$\mu$ (30$\mu$ each) at an extrusion laminating speed of 140 m/min., and an ozone-containing air was blown to the surface of the molten web to be adhered onto the substrate through a nozzle disposed at a distance of 30 mm from the bottom of the die to achieve treatment of the contact surface of the molten web with ozone. The amount of ozone used for the treatment was 21 mg/m$^2$. Then using a corona preheating apparatus and a corona discharge apparatus which were provided in-line with the extrusion laminater, the treatments were performed as follows: A substrate was heated with far infrared ray heater (9.6 KW output) keeping the distance between the substrate and the heater of 10 cm. At this time, the temperature of the surface of the substrate was 90° C. as measured by a surface contact type thermometer. Then there was produced as a substrate a biaxially stretched nylon film having a thickness of 15 μm and a width of 500 mm which had been modified by treating the surface thereof with corona discharge at a treatment density of 59 W·min./m$^2$ in an atmosphere of air with a corona discharge apparatus. Then the molten web after the treatment with ozone was laminated onto said substrate treated with corona discharge. In Example 16, there were provided EMMA for an adhesive layer with the plastic substrate and LLDPE for a sealant layer to produce laminate films having a total thickness of 60 (30μ each). The produced laminate films were evaluated for various properties. The results of the evaluation and the processing conditions are summarized in Table 4.

Examples 18 to 26
(Examples where an aging step was practiced)

In Example 18, a linear low density polyethylene (LLDPE, available from Sumitomo Chemical Industry Co. Ltd., under tradename "SUMIKATHENE α" CS8026 MFR 10 g/10 min., Density: 0.914 g/cm$^3$) was melt-kneaded with two extruders having an aperture diameter of 65 mm and extruded through a multi-slot T die at a resin temperature of 290° C. into a molten web having a width of 450 mm and a total thickness of 60μ (30 μ g each) at an extrusion laminating speed of 140 m/min., and an ozone-containing air was blown to the surface of the molten web to be adhered onto the substrate through a nozzle disposed at a distance of 30 mm from the bottom of the die to achieve treatment of the contact surface of the molten web with ozone. The amount of ozone used for the treatment was 21 mg/m$^2$. Then the molten web was laminated onto a 15μ biaxially stretched nylon substrate which had been modified by treating the surface thereof with corona discharge at a treatment density of 25 W·min./m$^2$ with a corona discharge apparatus provided in-line with the extrusion laminater. The produced laminate film was aged at 45° C. for 120 hours in an atmosphere of air to improve adhesive strength of the laminated film. In Examples 20, 21 and 26, there were provided LDPE or EMMA for an adhesive layer with the plastic substrate and LLDPE for a sealant layer to produce laminate films having a total thickness of 60 (20/40μ, or 30/30μ). In Examples 23, 24 and 25, using the similar procedure, there were produced LDPE single layer laminates. The produced laminate films were evaluated for various properties. The results of the evaluation and the processing conditions are shown in Tables 5 to 6.

Example 27

A low density polyethylene (LDPE, available from Sumitomo Chemical Industry Co. Ltd., under tradename "SUMIKATHENE", L716-H MFR 7 g/10 min., Density: 0.919 g/cm$^3$) was melt-kneaded with an extruder having an aperture diameter of 65 mm and extruded through a T die at a resin temperature of 315° C. into a molten web having a width of 450 mm a thickness of 40μ at an extrusion laminating speed of 80 m/min., and an ozone-containing air was blown to the surface of the molten web to be adhered onto the substrate through a nozzle disposed at a distance of 30 mm from the bottom of the die to achieve treatment of the contact surface of the molten web with ozone. The amount of ozone used for the treatment was 37 mg/m$^2$. Then the molten web was laminated onto a 15μ biaxially stretched ethylene-vinylalcohol copolymer film to produce a laminate film. The produced laminate film was evaluated for various properties as described below. The results of the evaluation and the processing conditions are given in Table 2.

Examples 28 to 30

Example 27 was repeated, except that the conditions as shown in Table 12 were employed. The results of the evaluation and the processing conditions are set forth in Table 12.

It can be seen from the results that all the examples satisfying the conditions of the present invention could afford satisfactory film adhesion strength. On the other hand, all the comparative Examples without effecting the corona discharge treatment and/or the ozone-treatment of the present invention resulted in insufficient film adhesion strength.

When the plastic substrate was of ethylene-vinylalcohol copolymer, all the examples satisfying the conditions of the present invention could afford satisfactory film adhesion strength. On the other hand, all the comparative Examples 1 to 3 without conducting the ozone-treating step gave insufficient film adhesion strength.

TABLE 1

| | Example | | | | |
|---|---|---|---|---|---|
| | 1 | 2 | 3 | 4 | 5 |
| Plastic substrate*1 | EVOH | EVOH | CEVOH | CEVOH | ONy |
| Resin for extrusion laminating*2 | LD | LL | LL | LL | LL |
| Process conditions | | | | | |
| Melt-extrusion temperature (° C.) | 315 | 295 | 295 | 260 | 290 |
| Speed (m/min.) | 80 | 120 | 120 | 80 | 80 |
| Thickness (μ) | 50 | 40 | 40 | 50 | 60 |
| Corona discharge treatment | | | | | |
| Treatment density (W · min/m$^2$) | 103 | 69 | 69 | 103 | 15 |
| (O/C)* | 0.413 | 0.410 | 0.332 | 0.339 | 0.230 |
| (O/C)$^0$ | 0.314 | 0.314 | 0.238 | 0.238 | 0.153 |
| Δ(O/C) | 0.099 | 0.096 | 0.094 | 0.101 | 0.077 |
| Ozone treatment | | | | | |
| Treatment amount (mg/m$^2$) | 37 | 25 | 25 | 37 | 37 |
| Evaluation | | | | | |
| Peel adhesion strength (g/15 mm) | Could not be separated | | | | 340 |

TABLE 2

| | Example | | | | |
|---|---|---|---|---|---|
| | 6 | 7 | 8 | 9 | 10 |
| Plastic substrate*1 | ONy | ONy | ONy | ONy | PET |
| Resin for extrusion laminating*2 | LL | LD LL | LD | EMMA | LL |

TABLE 2-continued

|  | Example | | | | |
| --- | --- | --- | --- | --- | --- |
|  | 6 | 7 | 8 | 9 | 10 |
| Process conditions |  |  |  |  |  |
| Melt-extrusion temperature (° C.) | 290 | 315 290 | 315 | 300 | 290 |
| Speed (m/min.) | 140 | 80 | 80 | 80 | 80 |
| Thickness (μ) | 60 | 20 40 | 40 | 40 | 60 |
| Corona discharge treatment |  |  |  |  |  |
| Treatment density (W · min/m²) | 59 | 103 | 103 | 103 | 103 |
| (O/C)* | 0.242 | 0.245 | 0.245 | 0.245 | 0.570 |
| (O/C)⁰ | 0.153 | 0.153 | 0.153 | 0.153 | 0.402 |
| Δ(O/C) | 0.089 | 0.092 | 0.092 | 0.092 | 0.168 |
| Ozone treatment |  |  |  |  |  |
| Treatment amount (mg/m²) | 21 | 37 | 37 | 37 | 37 |
| Evaluation |  |  |  |  |  |
| Peel adhesion strength (g/15 mm) | 600 | 610 | 520 | Resin break | 450 |

TABLE 3

|  | Example | | | |
| --- | --- | --- | --- | --- |
|  | 11 | 12 | 13 | 14 |
| Plastic substrate*1 | PET | PET | CNy | CNy |
| Resin for extrusion laminating*2 | LD | EMMA | LD LL | LD |
| Process conditions |  |  |  |  |
| Melt-extrusion temperature (° C.) | 315 | 300 | 315 290 | 315 |
| Speed (m/min.) | 80 | 80 | 80 | 80 |
| Thickness (μ) | 40 | 40 | 20 30 | 40 |
| Corona discharge treatment |  |  |  |  |
| Treatment density (W · min/m²) | 15 | 103 | 103 | 103 |
| (O/C)* | 0.503 | 0.570 | 0.220 | 0.220 |
| (O/C)⁰ | 0.402 | 0.402 | 0.158 | 0.158 |
| Δ(O/C) | 0.101 | 0.168 | 0.062 | 0.062 |
| Ozone treatment |  |  |  |  |
| Treatment amount (mg/m²) | 37 | 37 | 37 | 37 |
| Evaluation |  |  |  |  |
| Peel adhesion strength (g/15 mm) | 320 | 350 | 360 | 390 |

TABLE 4

|  | Example | | |
| --- | --- | --- | --- |
|  | 15 | 16 | 17 |
| Plastic substrate*1 | ONy | ONy | PET |
| Resin for extrusion laminating*2 | LL | EMMA LL | LL |
| Process conditions |  |  |  |
| Melt-extrusion temperature (° C.) | 290 | 290 290 | 290 |

TABLE 4-continued

|  | Example | | |
| --- | --- | --- | --- |
|  | 15 | 16 | 17 |
| Speed (m/min.) | 140 | 140 | 140 |
| Thickness (μ) | 60 | 30 30 | 60 |
| Corona discharge treatment |  |  |  |
| Treatment density (W · min/m²) | 59 | 59 | 59 |
| (O/C)* | 0.242 | 0.242 | 0.535 |
| (O/C)⁰ | 0.153 | 0.153 | 0.402 |
| Δ(O/C) | 0.089 | 0.089 | 0.133 |
| Ozone treatment |  |  |  |
| Treatment amount (mg/m²) | 21 | 21 | 21 |
| Corona preheating temperature (°C.) | 90 | 80 | 90 |
| Evaluation |  |  |  |
| Peel adhesion strength (g/15 mm) | 670 | 990 | 480 |

TABLE 5

|  | Example | | | | |
| --- | --- | --- | --- | --- | --- |
|  | 18 | 19 | 20 | 21 | 22 |
| Plastic substrate*1 | ONy | ONy | ONy | ONy | PET |
| Resin for extrusion laminating*2 | LL | LL | LD LL | EMMA LL | LL |
| Process conditions |  |  |  |  |  |
| Melt-extrusion temperature (° C.) | 290 | 290 | 315 290 | 290 290 | 290 |
| Speed (m/min.) | 140 | 140 | 140 | 140 | 80 |
| Thickness (μ) | 60 | 60 | 20 40 | 30 30 | 60 |
| Corona discharge treatment |  |  |  |  |  |
| Treatment density (W · min/m²) | 25 | 59 | 59 | 25 | 15 |
| (O/C)* | 0.238 | 0.242 | 0.242 | 0.218 | 0.503 |
| (O/C)⁰ | 0.153 | 0.153 | 0.153 | 0.153 | 0.402 |
| Δ(O/C) | 0.085 | 0.089 | 0.089 | 0.065 | 0.101 |
| Ozone treatment |  |  |  |  |  |
| Treatment amount (mg/m²) | 21 | 21 | 21 | 21 | 37 |
| Aging treatment |  |  |  |  |  |
| Temperature (°C.) | 45 | 45 | 40 | 45 | 45 |
| Time (hr.) | 120 | 48 | 12 | 120 | 120 |
| Evaluation |  |  |  |  |  |
| Peel adhesion strength (g/15 mm) | 550 | 730 | 640 | 1010 | 630 |

TABLE 6

|  | Example | | | |
| --- | --- | --- | --- | --- |
|  | 23 | 24 | 25 | 26 |
| Plastic substrate*1 | PET | PVA | PVA | CNy |
| Resin for extrusion laminating*2 | LD | LD | LD | LD LL |

TABLE 6-continued

| | Example | | | |
|---|---|---|---|---|
| | 23 | 24 | 25 | 26 |
| Process conditions | | | | |
| Melt-extrusion temperature (° C.) | 315 | 315 | 315 | 315 / 290 |
| Speed (m/min.) | 80 | 80 | 80 | 80 |
| Thickness (μ) | 40 | 40 | 40 | 20 / 40 |
| Corona discharge treatment | | | | |
| Treatment density (W · min/m$^2$) | 15 | 29 | 103 | 103 |
| (O/C)* | 0.503 | 0.512 | 0.524 | 0.220 |
| (O/C)$^0$ | 0.402 | 0.447 | 0.447 | 0.158 |
| Δ(O/C) | 0.101 | 0.065 | 0.077 | 0.062 |
| Ozone treatment | | | | |
| Treatment amount (mg/m$^2$) | 37 | 37 | 37 | 21 |
| Aging treatment | | | | |
| Temperature | 45 | 45 | 45 | 40 |
| Time (hr.) | 120 | 120 | 120 | 72 |
| Evaluation | | | | |
| Peel adhesion strength (g/15 mm) | 470 | 360 | 400 | 640 |

TABLE 7

| | Comparative Example | | | | |
|---|---|---|---|---|---|
| | 1 | 2 | 3 | 4 | 5 |
| Plastic substrate*1 | EVOH | EVOH | CEVOH | ONy | ONy |
| Resin for extrusion laminating*2 | LD | LL | LL | LL | LL |
| Process conditions | | | | | |
| Melt-extrusion temperature (° C.) | 315 | 295 | 295 | 290 | 290 |
| Speed (m/min.) | 80 | 80 | 80 | 140 | 140 |
| Thickness (μ) | 50 | 40 | 40 | 60 | 60 |
| Corona discharge treatment | | | | | |
| Treatment density (W · min/m$^2$) | — | 103 | 103 | — | 59 |
| (O/C)* | 0.329 | 0.413 | 0.339 | 0.191 | 0.242 |
| (O/C)$^0$ | 0.314 | 0.314 | 0.238 | 0.153 | 0.153 |
| Δ(O/C) | 0.015 | 0.099 | 0.101 | 0.038 | 0.089 |
| Ozone treatment | | | | | |
| Treatment amount (mg/m$^2$) | — | — | — | 21 | — |
| Corona preheating | | | | | |
| Temperature (°C.) | — | — | — | — | 90 |
| Evaluation | | | | | |
| Peel adhesion strength (g/15 mm) | 30 | 40 | 40 | 210 | <5 |

TABLE 8

| | Comparative Example | | | | |
|---|---|---|---|---|---|
| | 6 | 7 | 8 | 9 | 10 |
| Plastic substrate*1 | ONy | ONy | ONy | ONy | ONy |
| Resin for extrusion laminating*2 | LD | LD | LD | EMMA LL | EMMA LL |
| Process conditions | | | | | |
| Melt-extrusion temperature (° C.) | 315 | 315 | 315 | 290 | 290 |
| Speed (m/min.) | 120 | 120 | 120 | 140 | 140 |
| Thickness (μ) | 40 | 40 | 40 | 30 / 30 | 30 / 30 |
| Corona discharge treatment | | | | | |
| Treatment density (W · min/m$^2$) | — | — | 69 | — | 59 |
| (O/C)* | 0.191 | 0.191 | 0.243 | 0.191 | 0.242 |
| (O/C)$^0$ | 0.153 | 0.153 | 0.153 | 0.153 | 0.153 |
| Δ(O/C) | 0.038 | 0.038 | 0.090 | 0.038 | 0.089 |
| Ozone treatment | | | | | |
| Treatment amount (mg/m$^2$) | — | 25 | — | — | — |
| Corona preheating | | | | | |
| Temperature (°C.) | — | — | — | — | 80 |
| Evaluation | | | | | |
| Peel adhesion strength (g/15 mm) | 100 | 260 | 260 | 40 | 60 |

TABLE 9

| | Comparative Example | | | | |
|---|---|---|---|---|---|
| | 11 | 12 | 13 | 14 | 15 |
| Plastic substrate*1 | ONy | PET | PET | PET | PET |
| Resin for extrusion laminating*2 | EMMA | LL | LL | LL | LD |
| Process conditions | | | | | |
| Melt-extrusion temperature (° C.) | 300 | 290 | 290 | 290 | 315 |
| Speed (m/min.) | 80 | 80 | 80 | 80 | 80 |
| Thickness (μ) | 40 | 60 | 60 | 60 | 40 |
| Corona discharge treatment | | | | | |
| Treatment density (W · min/m$^2$) | — | — | — | 103 | — |
| (O/C)* | 0.191 | 0.469 | 0.469 | 0.570 | 0.469 |
| (O/C)$^0$ | 0.153 | 0.402 | 0.402 | 0.402 | 0.402 |
| Δ(O/C) | 0.038 | 0.067 | 0.067 | 0.168 | 0.067 |
| Ozone treatment | | | | | |
| Treatment amount (mg/m$^2$) | — | — | 37 | — | — |
| Evaluation | | | | | |
| Peel adhesion strength (g/15 mm) | 260 | <5 | 210 | <5 | 90 |

TABLE 10

| | Comparative Example | | | | |
|---|---|---|---|---|---|
| | 16 | 17 | 18 | 19 | 20 |
| Plastic substrate*1 | PET | PET | PET | PVA | PVA |
| Resin for extrusion | LD | LD | EMMA | LD | LD |

TABLE 10-continued

| | Comparative Example | | | | |
|---|---|---|---|---|---|
| | 16 | 17 | 18 | 19 | 20 |
| laminating*2 Process conditions | | | | | |
| Melt-extrusion temperature (° C.) | 315 | 315 | 300 | 315 | 315 |
| Speed (m/min.) | 80 | 80 | 80 | 80 | 80 |
| Thickness ($\mu$) | 40 | 40 | 40 | 40 | 40 |
| Corona discharge treatment | | | | | |
| Treatment density (W · min/m$^2$) | — | 103 | — | — | — |
| (O/C)* | 0.469 | 0.570 | 0.469 | 0.460 | 0.460 |
| (O/C)$^0$ | 0.402 | 0.402 | 0.402 | 0.447 | 0.447 |
| $\Delta$(O/C) | 0.067 | 0.168 | 0.067 | 0.013 | 0.013 |
| Ozone treatment | | | | | |
| Treatment amount (mg/m$^2$) | 37 | — | — | — | 37 |
| Evaluation | | | | | |
| Peel adhesion strength (g/15 mm) | 240 | 280 | 270 | 30 | 60 |

TABLE 11

| | Comparative Example | | | |
|---|---|---|---|---|
| | 21 | 22 | 23 | 24 |
| Plastic substrate*1 Resin for extrusion | PVA | CNy | CNy | CNy |
| laminating*2 | LD | LD LL | LD LL | LD LL |
| Process conditions | | | | |
| Melt-extrusion temperature (°C.) | 315 | 315 290 | 315 290 | 315 290 |
| Speed (m/min.) | 80 | 80 | 80 | 80 |
| Thickness ($\mu$) | 40 | 20 30 | 20 30 | 20 30 |
| Corona discharge treatment | | | | |
| Treatment density (W · min/m$^2$) | 103 | — | — | 103 |
| (O/C)* | 0.524 | 0.185 | 0.185 | 0.220 |
| (O/C)$^0$ | 0.447 | 0.158 | 0.158 | 0.158 |
| $\Delta$ (O/C) | 0.077 | 0.027 | 0.027 | 0.062 |
| Ozone treatment | | | | |
| Treatment amount (mg/m$^2$) | — | — | 37 | — |
| Evaluation | | | | |
| Peel adhesion strength (g/15 mm) | 190 | 140 | 180 | 270 |

*1Plastic substrate
EVOH: Biaxially stretched EVOH (ethylene-vinylalcohol copolymer), EF-XL type 15$\mu$, available from Kuraray Co. Ltd.
CEVOH: Unstretched EVOH, EF-E type 20$\mu$, available from Kuraray Co. Ltd.
ONy: Biaxially stretched nylon, ON type 15$\mu$, available from Unichika Co. Ltd.
Unstretched nylon, General type 25$\mu$, available from Toray Co. Ltd.
PET: Biaxially stretched polyester, E5100 type 25$\mu$, available from Toyoboseki Co. Ltd.
PVA: Biaxially stretched polyvinylalcohol, BOBRON 25$\mu$, available from Nichigo Film Co. Ltd.

TABLE 11-continued

| | Comparative Example | | | |
|---|---|---|---|---|
| | 21 | 22 | 23 | 24 |

The data in the item "Corona discharge treatment" represent the corona treatments performed according to the present invention independently of corona treatments which might be effected to commercially available films before purchased.
*2Resins for extrusion laminating
LL: LLDPE linear low density polyethylene, available from Sumitomo Chemical Industry Co. Ltd., under tradename "SUMIKASEN", α CS8026, MFR 10 g/10 min., Density: 0.914 g/cm$^3$.
LD: LDPE low density polyethylene, available from Sumitomo Chemical Industry Co. Ltd., under tradename "SUMIKASEN", L716-H MFR 7 g/10 min., Density: 0.919 g/cm$^3$.
EMMA: ethylene-methylmethacrylate copolymer, available from Sumitomo Chemical Industry Co. Ltd., under tradename "AKURIFT", WH302 MFR 7 g/10 min., Density: 0.930 g/cm$^3$; Content of methylmethacrylate: 15 wt. %.

TABLE 12

| | Example | | | |
|---|---|---|---|---|
| | 27 | 28 | 29 | 30 |
| Plastic substrate*1 Resin for extrusion | EVOH | EVOH | CEVOH | EVOH |
| laminating*2 Process conditions | LDPE | LDPE | LLDPE | LLDPE |
| Melt-extrusion temperature (°C.) | 315 | 315 | 295 | 295 |
| Speed (m/min.) | 80 | 80 | 80 | 80 |
| Thickness ($\mu$) | 40 | 40 | 40 | 40 |
| Corona discharge treatment | | | | |
| Treatment density (W · min/m$^2$) | — | 15 | — | — |
| Ozone treatment | | | | |
| Treatment amount (mg/m$^2$) | 37 | 37 | 37 | 37 |
| Evaluation | | | | |
| Peel adhesion strength (g/15 mm) | Could not be separated | | | 460 |

The mark "—" represents that the treatment was not conducted.
*1Substrate
EVOH: Biaxially stretched ethylene-vinylalcohol copolymer film, EF-XL type 15$\mu$, available from Kuraray Co. Ltd.
CEVOH: Unstretched ethylene-vinylalcohol copolymer film, EF-E type 20$\mu$, available from Kuraray Co. Ltd.
The substrates used were those purchased which had been subjected to corona treatments and the corona-treated surface was used as adhesion surface.
*2Resins for extrusion laminating
LDPE: Low density polyethylene, available from Sumitomo Chemical Industry Co. Ltd., under tradename "SUMIKASEN", L716-H MFR 7 g/10 min., Density: 0.919 g/cm$^3$.
LLDPE: Linear low density polyethylene, available from Sumitomo Chemical Industry Co. Ltd., under tradename "SUMIKASEN", α CS8026, MFR 10 g/10 min., Density: 0.914 g/cm$^3$.

As described above, the present invention can provide a process for producing an extrusion laminated film and an extrusion laminated sheet comprising a plastic substrate and at least one resin for extrusion laminating selected from the group consisting of polyethylene resins, polypropylene resins, ethylene-vinylester copolymer resins and ethylene-(metha)acrylate copolymer resins, which enables production of strongly adhered laminated films and sheets without using any chemical primer which may cause various problems.

What is claimed is:

1. A process for producing an extrusion laminated film or sheet comprising a plastic substrate and a resin for extrusion laminating selected from the group consisting of polyethylene resins, polypropylene resins, ethylene-vinylester copolymer resins and ethylene-(metha)acrylate copolymer resins, comprising (A) a surface oxidizing step, (B) an ozone-treating step and (C) a pressurized laminating step as defined below using no chemical primer:

(A) Surface oxidizing step: Subjecting at least one of the surfaces of the plastic substrate to a surface oxidizing treatment under the conditions as expressed by the following formula:

(1) When the plastic substrate is of polyester resins, $$\Delta(O/C) \geq 0.08$$

(2) When the plastic substrate is of other materials than polyester resins, $$\Delta(O/C) \geq 0.05$$

with $\Delta(O/C)=(O/C)^*-(O/C)^\circ$, where $(O/C)^\circ$ represents a ratio of the number of oxygen atoms to the number of carbon atoms on the untreated surface of the plastic substrate measured by an ESCA method, and $(O/C)^*$ represents a ratio of the number of oxygen atoms to the number of carbon atoms on the oxidized surface of the plastic substrate measured by the ESCA method;

(B) Ozone-treating step: Melt-extruding a resin for extrusion laminating into a molten web at a temperature of 180° C. to 340° C. and subjecting at least one of the surfaces of the molten web to a treatment with ozone;

(C) Pressurized laminating step: Contacting the oxidized surface of the plastic substrate obtained in (A) the surface oxidizing step with the ozone-treated surface of the molten web obtained in (B) the ozone-treating step, and adhering the molten web onto the substrate under pressure while maintaining the oxidized surface of the plastic substrate to be adhered under pressure;

wherein said pressurized laminating step is conducted while maintaining the $\Delta O/C$ such that $\Delta(O/C) \geq 0.08$ when the plastic substrate is of polyester resins and $\Delta(O/C) \geq 0.05$ when the plastic substrate is of materials other than polyester resins; and wherein (A) the surface oxidizing step and (C) the pressurized laminating step are provided in-line so as to transfer the plastic substrate to (C) the pressurized laminating step immediately after the end of (A) the surface oxidizing step.

2. The process for producing an extrusion laminated film or sheet according to claim 1, wherein the conditions for the oxidized surface of the plastic substrate in (A) the surface oxidizing step are expressed by the following formula:

(1) When the plastic substrate is of polyester resins, $$\Delta(O/C) \geq 0.10$$

(2) When the plastic substrate is of other materials than polyester resins, $$\Delta(O/C) \geq 0.07$$

3. The process for producing an extrusion laminated film or sheet according to claim 1, wherein before (A) the surface oxidizing step there is provided ($A_o$) a preheating step as defined below:

($A_o$) Preheating step: the plastic substrate to be subjected to the surface oxidizing treatment is heated at a temperature of not lower than 40° C., but not higher than the melting point of the plastic substrate.

4. The process for producing an extrusion laminated film or sheet according to claim 1, wherein after (C) the pressurized laminating step there is provided (D) an aging step as defined below:

(D) Aging step: the extrusion laminated film or sheet obtained in (C) the pressurized laminating step is aged in a warmed atmosphere.

5. The process for producing an extrusion laminated film or sheet according to claim 4, wherein the aging temperature is not lower than 30° C., but less than 50° C.

6. The process for producing an extrusion laminated film or sheet according to claim 1, wherein ($A_0$) the preheating step as described in claim 3 is provided before (A) the surface oxidizing step and the aging step as described in claim 4 is provided after (C) the pressurized laminating step.

7. The process for producing an extrusion laminated film or sheet according to claim 1, wherein (A) the surface oxidizing step is ($a_1$) a corona discharge treatment step as defined below:

($a_1$) Corona discharge treatment step: treating at least one of the surfaces of the plastic substrate with corona discharge.

8. The process for producing an extrusion laminated film or sheet according to claim 7, wherein a corona discharge density at ($a_1$) the corona discharge treatment step is not less than 40 W·min./m².

9. The process for producing an extrusion laminated film or sheet according to claim 1, wherein ($A_0$) the preheating step as described in claim 3 is provided before (A) the surface oxidizing step, (A) the surface oxidizing step is ($a_1$) the corona discharge treatment step as described in claim 7, and the corona discharge density at ($a_1$) the corona discharge treatment step is not less than 10 W·min./m².

10. The process for producing an extrusion laminated film or sheet according to claim 1, wherein (D) the aging step as described in claim 4 is provided after (C) the pressurized laminating step, (A) the surface oxidizing step is ($a_1$) the corona discharge treatment step as described in claim 7, and the corona discharge density at ($a_1$) the corona discharge treatment step is not less than 10 W·min./m².

11. The process for producing an extrusion laminated film or sheet according to claim 1, wherein ($A_0$) the preheating step as described in claim 3 is provided before (A) the surface oxidizing step, (D) the aging step as described in claim 4 is provided after (C) the pressurized laminating step, (A) the surface oxidizing step is ($a_1$) the corona discharge treatment step as described in claim 7, and the corona discharge density at ($a_1$) the corona discharge treatment step is not less than 10 W·min./m².

12. The process for producing an extrusion laminated film or sheet according to claim 1, wherein (A) the surface oxidizing step is ($a_2$) a plasma-treating step as defined below:

($a_2$) Plasma-treating step: subjecting at least one of the surfaces of the plastic substrate to the treatment with plasma.

13. The process for producing an extrusion laminated film or sheet according to claim 1, wherein (A) the surface oxidizing step is ($a_3$) a flame plasma-treating step as defined below:

($a_3$) Flame plasma-treating step: subjecting at least one of the surfaces of the plastic substrate to the treatment with flame plasma.

14. The process for producing an extrusion laminated film or sheet according to claim 1, wherein (A) the surface oxidizing step is ($a_4$) an electron beam irradiation step as defined below:

(a₄) Electron beam irradiation step: irradiating at least one of the surfaces of the plastic substrate with electron beam.

15. The process for producing an extrusion laminated film or sheet according to claim 1, wherein (A) the surface oxidizing step is (a₅) a UV irradiating treatment step as defined below:

(a₅) UV irradiating treatment step: irradiating at least one of the surfaces of the plastic substrate with ultraviolet radiation.

16. A process for producing an extrusion laminated film or sheet consisting of a plastic substrate and a resin for extrusion laminating selected from the group consisting of polyethylene resins, polypropylene resins, ethylene-vinylester copolymer resins and ethylene-(metha)acrylate copolymer resins, comprising (A) a surface oxidizing step, (B) an ozone-treating step and (C) a pressurized laminating step as defined below using no chemical primer:

(A) Surface oxidizing step: Subjecting at least one of the surfaces of the plastic substrate to a surface oxidizing treatment under the conditions as expressed by the following formula:

(1) When the plastic substrate is of polyester resins, $$\Delta(O/C) \geq 0.08$$

(2) When the plastic substrate is of other materials than polyester resins, $$\Delta(O/C) \geq 0.05$$

with $\Delta(O/C) = (O/C)^* - (O/C)°$, where $(O/C)°$ represents a ratio of the number of oxygen atoms to the number of carbon atoms on the untreated surface of the plastic substrate measured by an ESCA method, and $(O/C)^*$ represents a ratio of the number of oxygen atoms to the number of carbon atoms on the oxidized surface of the plastic substrate measured by the ESCA method;

(B) Ozone-treating step: Melt-extruding a resin for extrusion laminating into a molten web at a temperature of 180° C. to 340° C. and subjecting at least one of the surfaces of the molten web to a treatment with ozone;

(C) Pressurized laminating step: Contacting the oxidized surface of the plastic substrate obtained in (A) the surface oxidizing step with the ozone-treated surface of the molten web obtained in (B) the ozone-treating step, and adhering the molten web onto the substrate under pressure while maintaining the oxidized surface of the plastic substrate to be adhered under pressure;

wherein said pressurized laminating step is conducted while maintaining a $\Delta O/C$ such that $\Delta(O/C) \geq 0.08$ when the plastic substrate is of polyester resins and $\Delta(O/C) \geq 0.05$ when the plastic substrate is of materials other than polyester resins; and wherein (A) the surface oxidizing step and (C) the pressurized laminating step are provided in-line so as to transfer the plastic substrate to (C) the pressurized laminating step immediately after the end of (A) the surface oxidizing step.

* * * * *

UNITED STATES PATENT AND TRADEMARK OFFICE
CERTIFICATE OF CORRECTION

PATENT NO. : 5,913,999
DATED : June 22, 1999
INVENTOR(S) : Haruo HAYASHIDA, et al It is certified that error appears in the above-identified patent and that said Letters Patent is hereby corrected as shown below:

IN THE CLAIMS:

5. (Amended) The process for producing an extrusion laminated film or sheet according to claim 4, wherein the <u>extrusion laminated film or sheet is aged at a</u> [aging] temperature <u>of from</u> [is not lower than] 30°C [, but] <u>to</u> less than 50°C.

Claim 12, line 6, delete "the" (second occurrence) and insert therefor --a--.

Claim 13, line 6, delete "the" (third occurrence) and insert therefor --a--.

Claim 14, line 6, after "with" insert --an--.

Signed and Sealed this

Twentieth Day of February, 2001

*Attest:*

NICHOLAS P. GODICI

*Attesting Officer*  Acting Director of the United States Patent and Trademark Office